(12) United States Patent
Wang (10) Patent No.: US 11,029,500 B2
(45) Date of Patent: Jun. 8, 2021

(54) LENS MODULE (71) Applicant: AAC Technologies Pte. Ltd., Singapore (SG)

(72) Inventor: Hailong Wang, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 180 days.

(21) Appl. No.: 16/530,982

(22) Filed: Aug. 2, 2019

(65) Prior Publication Data
US 2020/0057283 A1    Feb. 20, 2020

(30) Foreign Application Priority Data

Aug. 15, 2018 (CN) .......................... 201821317395.8

(51) Int. Cl.
*G03B 7/02* (2021.01)
*G02B 13/16* (2006.01)
*G03B 11/04* (2021.01)
*G02B 13/00* (2006.01)
*G03B 30/00* (2021.01)
*G02B 7/00* (2021.01)
*G03B 17/12* (2021.01)
*G02B 7/02* (2021.01)
*G03B 19/14* (2021.01)
*G03B 17/02* (2021.01)
*G03B 19/02* (2021.01)

(52) U.S. Cl.
CPC .......... *G02B 13/16* (2013.01); *G02B 13/0015* (2013.01); *G03B 11/045* (2013.01); *G02B 7/003* (2013.01); *G02B 7/02* (2013.01); *G02B 13/001* (2013.01); *G03B 17/02* (2013.01); *G03B 17/12* (2013.01); *G03B 19/02* (2013.01); *G03B 19/14* (2013.01); *G03B 30/00* (2021.01); *G03B 2217/002* (2013.01)

(58) Field of Classification Search
CPC ........ G02B 7/02; G02B 7/003; G02B 13/001; G02B 13/0015; G03B 11/045; G03B 17/02; G03B 17/12; G03B 19/02; G03B 19/14; G03B 2217/002; G03B 30/00
USPC ................................. 359/819, 821, 829, 830
See application file for complete search history.

(56) References Cited

U.S. PATENT DOCUMENTS

| 7,417,810 | B2* | 8/2008 | Feng | ...................... | G02B 7/023 |
| | | | | | 359/811 |
| 8,014,655 | B2* | 9/2011 | Chang | .................... | G02B 7/021 |
| | | | | | 359/819 |

(Continued)

*Primary Examiner* — Evelyn A Lester
(74) *Attorney, Agent, or Firm* — W&G Law Group LLP (57) ABSTRACT

A lens module includes a lens barrel and a lens group having a first second lenses. An image side surface of a first barrel wall includes a first planar surface, a first oblique surface extending towards the optical axis and towards the image side, and a second planar surface. An object side surface of a peripheral portion of the first lens includes a third planar surface attached to the first planar surface and a second oblique surface attached to the first oblique surface. An image side surface of the peripheral portion of the first lens includes a fifth planar surface, a third oblique surface extending towards the optical axis and towards the image side, and a sixth planar surface. An object side surface of the second lens includes a seventh planar surface attached to the fifth planar surface and a fourth oblique surface paced apart from the third oblique surface.

15 Claims, 5 Drawing Sheets

(56) References Cited

U.S. PATENT DOCUMENTS

| | | | | |
|---|---|---|---|---|
| 8,270,103 B2* | 9/2012 | Miyawaki | ............... | G02B 7/022 |
| | | | | 359/819 |
| 8,292,524 B1* | 10/2012 | Yu | ......................... | G02B 13/004 |
| | | | | 396/529 |
| 9,304,233 B2* | 4/2016 | Kim | .................... | G02B 13/0015 |
| 2008/0239519 A1* | 10/2008 | Lin | ....................... | G02B 13/003 |
| | | | | 359/819 |
| 2011/0085070 A1* | 4/2011 | Kang | ...................... | G02B 7/022 |
| | | | | 359/819 |
| 2013/0271858 A1* | 10/2013 | Koh | ....................... | G02B 7/021 |
| | | | | 359/819 |
| 2014/0078606 A1* | 3/2014 | Wu | .......................... | G02B 7/02 |
| | | | | 359/827 |
| 2016/0085046 A1* | 3/2016 | Kim | ....................... | G02B 7/026 |
| | | | | 359/830 |

\* cited by examiner

LENS MODULE

TECHNICAL FIELD

The disclosure relates to the field of camera lenses, and in particular, to a lens module.

BACKGROUND

With the continuous development of technology, electronic devices are becoming more and more intelligent. In addition to digital cameras, portable electronic devices such as tablets and mobile phones are also equipped with lens modules. In order to meet people's needs, higher requirements are raised on the imaging quality of the object captured by the lens module.

However, in the current lens structure, a matching structure of two to three lenses is generally used, and basically all of the lenses are plastic lenses. The lens has to match the lens barrel or other components due to the outer diameter precision problem of the glass lens. However, the combination of glass lenses is always a problem, and the assembly of the lenses with less matching is unstable, and may affect the overall performance of the lens. The existing matching methods still can be improved. In order to further improve the assembly stability and better meet the accuracy requirements on the lens itself, it is urgent to provide a new type of lens module.

BRIEF DESCRIPTION OF THE DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be further illustrated with reference to the accompanying drawings and the embodiments. In the embodiments described below, a direction defined by left and right sides of paper is referred to as a horizontal direction, and a direction defined by upper and lower sides of the paper and perpendicular to the horizontal direction is referred to as a vertical direction. In the present disclosure, a direction of a central axis is parallel to the vertical direction.

Figure 1:
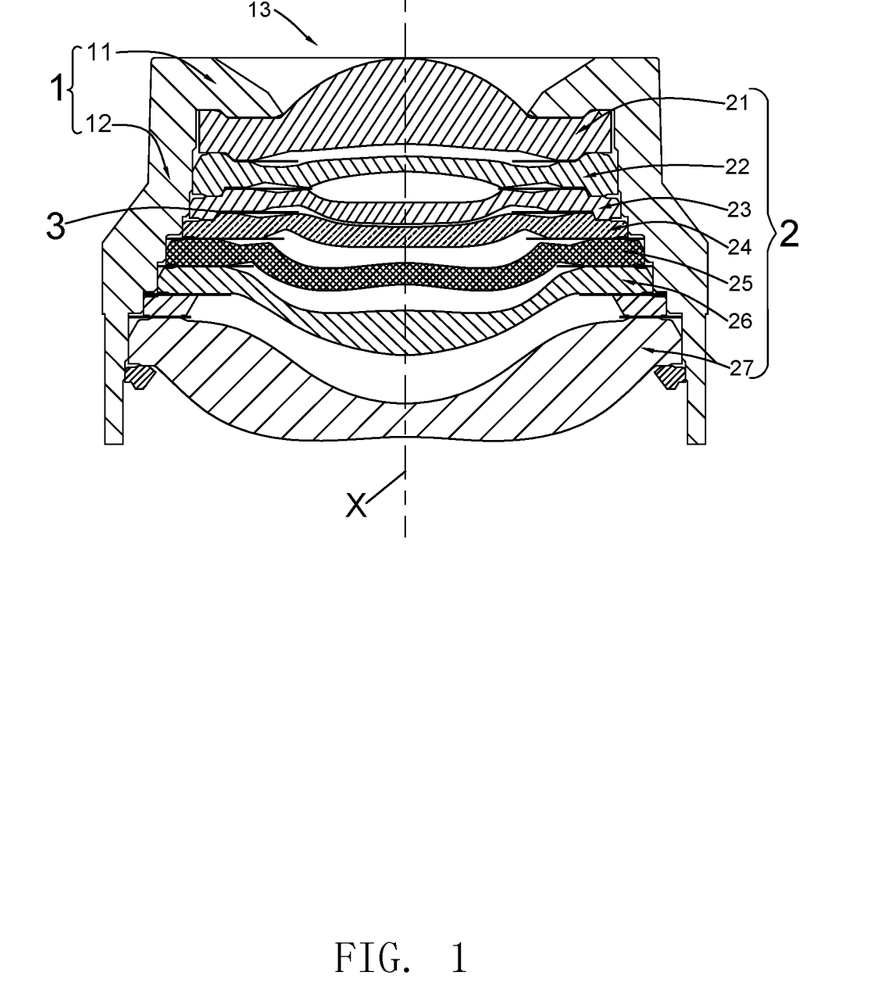
FIG. 1 is a structural cross-sectional view of a lens module of the present disclosure.

As shown in FIG. 1, the present disclosure provides a novel lens module. The lens module includes a lens barrel 1 and a lens group 2 received in the lens barrel 1. The lens group 2 includes a first lens 21, a second lens 22, a third lens 23, a fourth lens 24, a fifth lens 25, a sixth lens 26, and a seventh lens 27 that sequentially match each other from an object side to an image side of the lens barrel 1.

Figure 2:
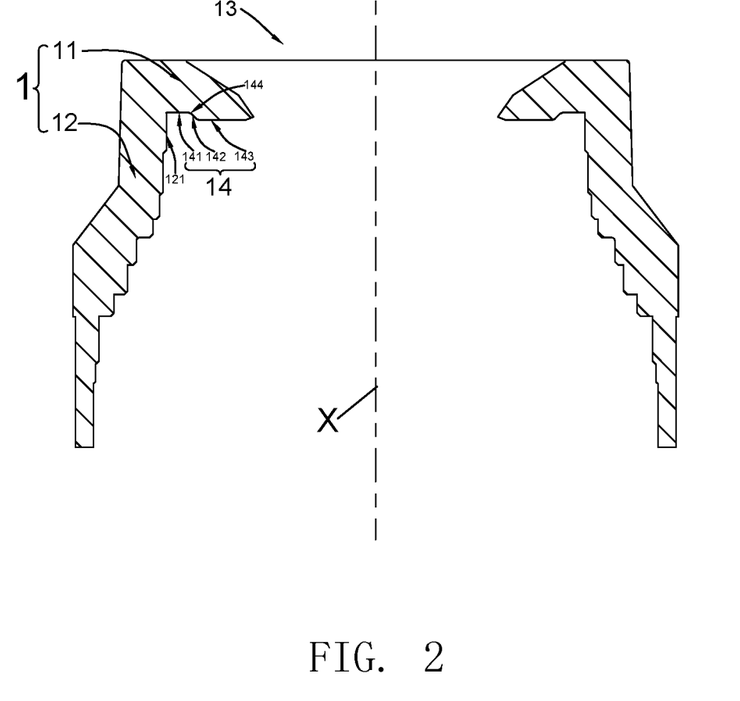
FIG. 2 is a structural cross-sectional view of a lens barrel of the present disclosure.

In the present embodiment, as shown in FIG. 2, the lens barrel 1 includes a first barrel wall 11 defining a light through hole 13 and extending in a horizontal direction, a second barrel wall 12 extending from the first barrel wall 11 while being bent. The first barrel wall 11 and the second barrel wall 12 define a receiving space. The first barrel wall 11 includes a first surface close to the object side and a second surface close to the image side. The lens barrel 1 can be an integral structure or a split structure.

Further, the first lens 21 is a glass lens. The second lens 22, the third lens 23, the fourth lens 24, the fifth lens 25, the sixth lens 26 and the seventh lens 27 are preferably plastic lenses, and can also be plastic lenses or lenses made of other materials. Each lens includes an optical portion and a peripheral portion surrounding the optical portion. Each lens has an upper surface as an object side surface, and a lower surface as an image side surface. In addition, the number of lenses in the lens group 12 is not limited thereto.

In order to further improve the assembly stability of the lens and the imaging quality of the lens, the matching structures between the first lens 21 and the lens barrel 1 and between the lenses are improved. The specific solutions are described as follows.

As shown in FIG. 1 and FIG. 2, the lens module has a symmetrical shape. Therefore, the left side portion of the lens module is described in detail as an example. For example, the second surface of the first barrel wall 11 includes a barrel matching portion 14 for matching the first lens 21. The barrel matching portion 14 includes a first planar surface 141 horizontally extending from a joint between the first barrel wall 11 and the second barrel wall 12 towards an optical axis, a first oblique surface 142 obliquely extending from the first planar surface 141 towards the optical axis and towards the image side, and a second planar surface 143 horizontally extending from the first oblique surface 142 towards the optical axis. The first oblique surface 142, the first planar surface 141 and the second planar surface 143 can be connected to each other via an arcuate surface, or directly connected to each other in a right angle. In the present embodiment, a first arcuate transition surface 144 is provided between the first planar surface 141 and the first oblique surface 142. The second barrel wall 12 includes an inner wall surface close to the optical axis X and an outer wall surface opposite to the inner wall surface. The inner wall surface of the second barrel wall 12 includes a first vertical surface 121 vertically extending from the first planar surface 141 along the optical axis X, referring to FIG. 2.

Figure 3:
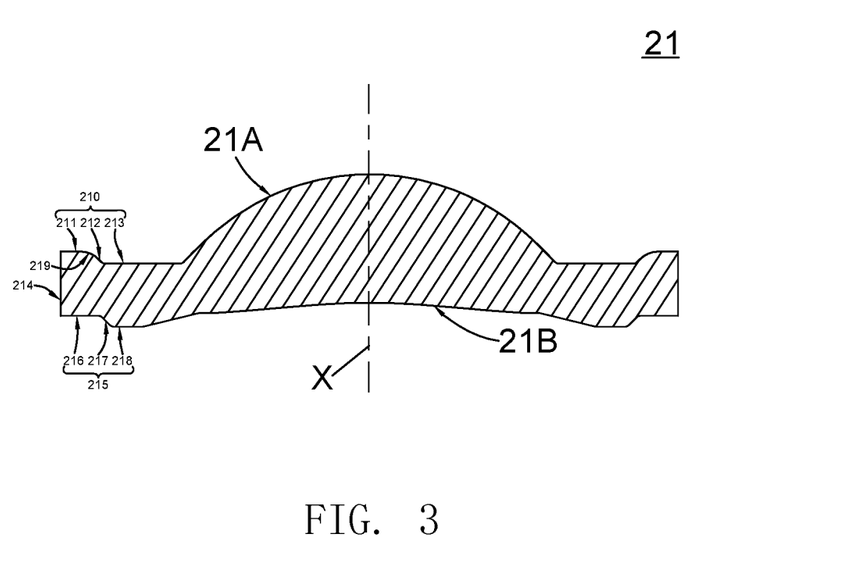
FIG. 3 is a structural cross-sectional view of a first lens of the present disclosure.

As shown in FIG. 3, the first lens 21 has a symmetrical structure. The left side portion of the first lens 21 is described in detail as an example. The first lens 21 has an upper surface as an object side surface 21A, and a lower surface as an image side surface 21B. The object side surface 21A of the first peripheral portion of the first lens 21 includes a first matching structure 210 for matching the lens barrel 1. The first matching structure 210 includes, for example, a third planar surface 211 horizontally extending from an edge of the first peripheral portion towards the optical axis, a second oblique surface 212 obliquely extending from the third planar surface 211 towards the optical axis and towards the image side, and a fourth planar surface 213 horizontally extending from the second oblique surface 212 towards the optical axis. The second oblique surface 212, the third planar surface 211 and the fourth planar surface 213 can be connected to each other via an arcuate surface or directly connected to each other in a right angle. In the present embodiment, a second arcuate transition surface 219 is provided between the third planar surface 211 and the second oblique surface 212. The second arcuate transition surface 219 is spaced apart from the first arcuate transition surface 144, or the second arcuate transition surface 219 is spaced apart from the image side surface of the first cylinder wall 11. The first lens 21 further includes a connection surface 214 for connecting the object side surface 21A with the image side surface 21B, i.e., for connecting the upper surface with the lower surface.

In the present embodiment, when the first lens 21 and the lens barrel 1 are positioned and assembled, the first matching portion 210 of the first lens 21 matches the barrel matching portion 14 of the first barrel wall 11 to assemble the first lens 21. For example, the first planar surface 141 is attached to the third planar surface 211. An outer edge of the first lens 21 is spaced apart from the inner wall surface of the second barrel wall 12, i.e., the connection surface 214 is spaced apart from the first vertical surface 121. The first oblique surface 142 is partially attached to the second oblique surface 212. The second planar surface 143 is spaced apart from the fourth planar surface 213. Further, the first oblique surface 142 has the same slope as the second oblique surface 212. The slope of the second oblique surface 212 and the slope of the third oblique surface 217 can be either equal or not.

In addition, the image side surface 21B of the first peripheral portion of the first lens 21 includes a second matching structure 215 for matching the second lens 22. The second matching structure 215 includes, for example, a fifth planar surface 216 horizontally extending from the edge of the first peripheral portion towards the optical axis, a third oblique surface 217 obliquely extending from the fifth planar surface 216 towards the optical axis and towards the image side, and a sixth planar surface 218 horizontally extending from the third oblique surface 217 towards the optical axis.

Figure 4:
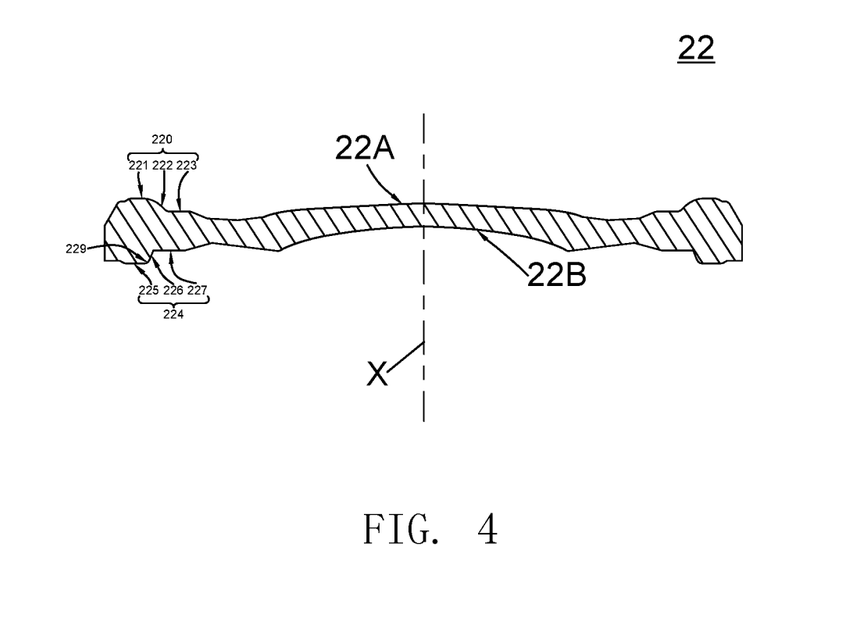
FIG. 4 is a structural cross-sectional view of a second lens of the present disclosure.

As shown in FIG. 4, the second lens 22 has an upper surface as an object side surface 22A, and a lower surface as an image side surface 22B. The second lens 22 includes a second optical portion and a second peripheral portion surrounding the second optical portion. The object side surface 22A of the second peripheral portion of the second lens 22 includes a third matching structure 220 for matching the image side surface 21B of the first lens 21. The third matching structure 220 includes, for example, a seventh planar surface 221 attached to the fifth planar surface 216, a fourth oblique surface 222 obliquely extending from the seventh planar surface 221 towards the optical axis and towards the image side, and an eighth planar surface 223 obliquely extending from the fourth oblique surface 222. The fourth oblique surface 222, the seventh planar surface 221 and the fourth planar surface 213 can be connected to each other via an arcuate surface or directly connected to each other in a right angle. The seventh planar surface 221 is spaced apart from an outer edge of the second lens 22. In other words, the object side surface 22A of the second lens 22 further includes a first recess portion connected to the seventh planar surface 221. The first recess portion is formed by recessing from the object side towards the image side. The first recess portion is spaced apart from the fifth planar surface 216.

In the embodiment, the fifth planar surface 216 is partially attached to the seventh planar surface 221. The fourth oblique surface 222 is spaced apart from the third oblique surface 217. A light-shading sheet 3 is disposed in a gap formed between the sixth planar surface 218 and the eighth planar surface 223. The light-shading sheet 3 is disposed at a position closer to the optical axis X than the third oblique surface 217. The third oblique surface 217 can have a slope equal to or different from that of the fourth oblique surface 222. The outer edge of the second lens 22 has an end surface abutting against the inner wall surface of the second barrel wall 12.

As can be seen from FIG. 4, the image side surface 22B of the second lens 22 includes a fourth matching structure 224 for matching an object side surface 23A of the third lens 23. For example, the fourth matching structure 224 includes a ninth planar surface 225 attached to the object side surface 23A of the third lens 23, a fifth oblique surface 226 obliquely extending from the ninth planar surface 225 towards the optical axis and towards the object side, and a tenth planar surface 227 horizontally extending from the fifth oblique surface 226 towards the optical axis. Further, a third arcuate transition surface 229 is provided between the ninth planar surface 225 and the fifth oblique surface 226. The third arcuate transition surface 229 is spaced apart from the object side surface 23A of the third lens 23. The object side surface 23A of the third lens 23 includes an eleventh planar surface 231 attached to the ninth planar surface 225, a sixth oblique surface 232 attached to the fifth oblique surface 226, and a twelfth planar surface 233 horizontally extending from the sixth oblique surface 232 towards the optical axis. The light-shading sheet 3 is disposed between the tenth planar surface 227 and the twelfth planar surface 233, referring to FIGS. 1 and 5.

Figure 5:
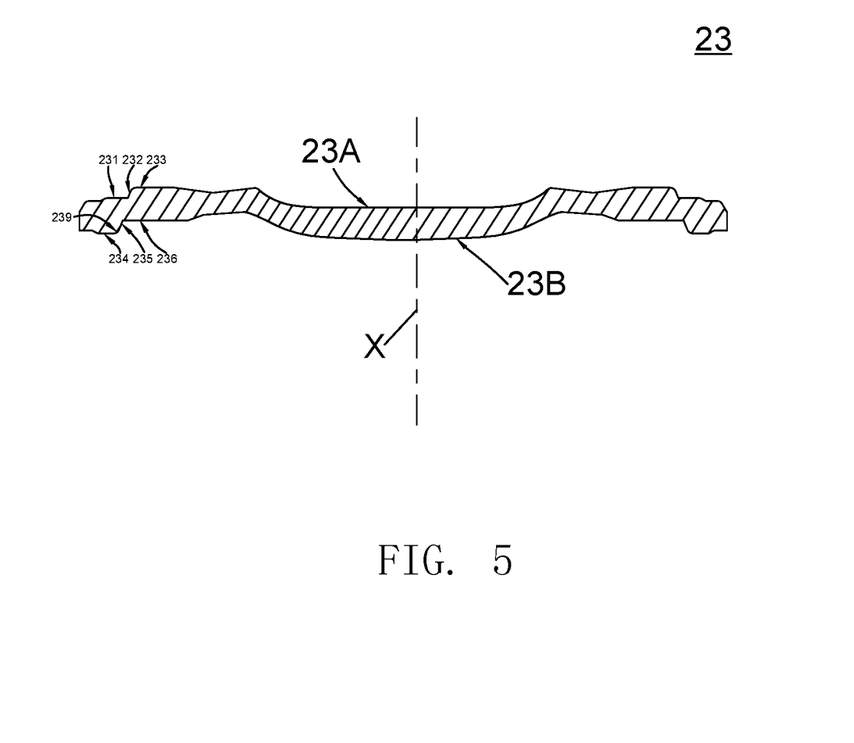
FIG. 5 is a structural cross-sectional view of a third lens in the present disclosure.
Figure 6:
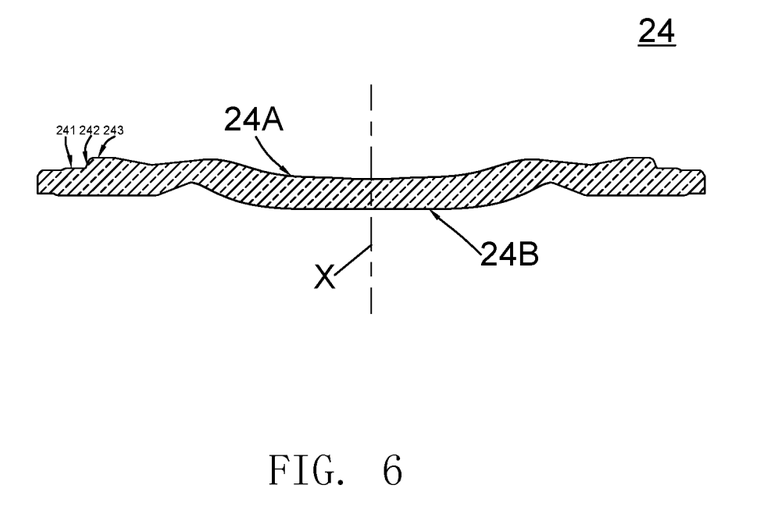
FIG. 6 is a structural cross-sectional view of a fourth lens of the present disclosure.
Figure 7:
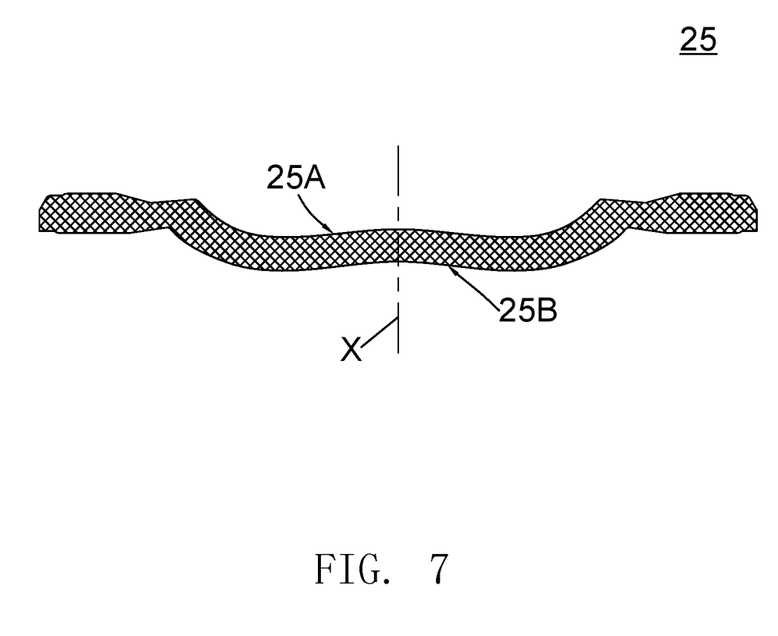
FIG. 7 is a structural cross-sectional view of a fifth lens of the present disclosure.
Figure 8:
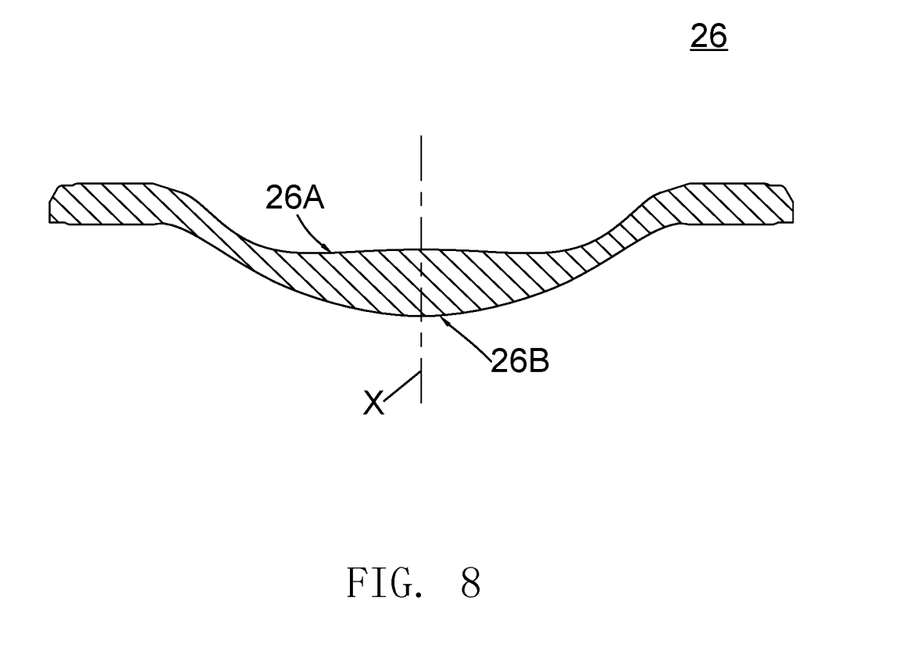
FIG. 8 is a structural cross-sectional view of a sixth lens of the present disclosure.
Figure 9:
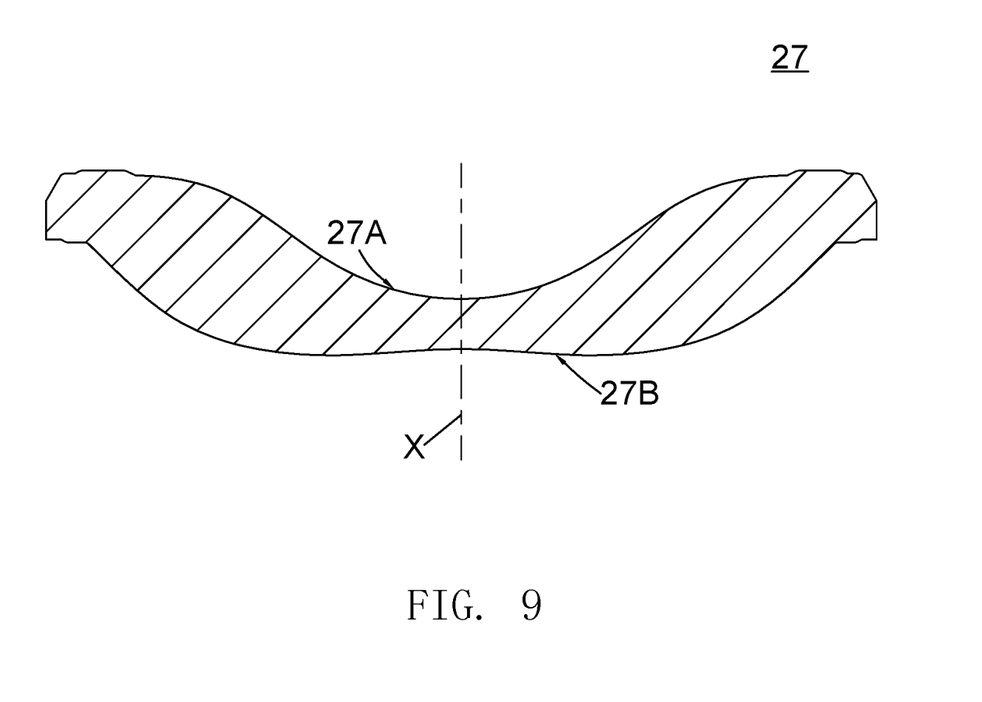
FIG. 9 is a structural cross-sectional view of a seventh lens of the present disclosure.

As shown in FIG. 5, in the present embodiment, the matching structure between an image side surface 23B of the third lens 23 and an object side surface 24A of the fourth lens 24 is the same as the fourth matching structure 224. Further, the image side surface 23B of the third lens 23 includes a thirteenth planar surface 234 attached to the object side surface 24A of the fourth lens 24, a seventh oblique surface 235 obliquely extending from the thirteenth planar surface 234 towards the optical axis and towards the object side, and a fourteenth planar surface 236 horizontally extending from the seventh oblique surface 235 towards the optical axis. Further, a fourth arcuate transition surface 239 is provided between the thirteenth planar surface 234 and the seventh oblique surface 235. The fourth arcuate transition surface 239 is spaced apart from the object side surface 24A of the fourth lens 24. The object side surface 24A of the fourth lens 24 includes a fifteenth planar surface 241 attached to the thirteenth planar surface 234, an eighth oblique surface 242 attached to the seventh oblique surface 235, and a sixteenth planar surface 243 horizontally extending from the eighth oblique surface 242 towards the optical axis X. The light-shading sheet 3 is disposed between the fourteenth planar surface 236 and the sixteenth planar surface 243, referring to FIGS. 1 and 6

As shown in FIG. 6 to FIG. 9, the light-shading sheets 3 are sandwiched between the fourth lens 24 and the fifth lens 25 and between the fifth lens 25 and the sixth lens 26, respectively. A light-shading sheet and a light-shading plate are sandwiched between the sixth lens 26 and the seventh lens 27. In addition, the second lens 22, the third lens 23, the fourth lens 24, the fifth lens 25, the sixth lens 26, and the seventh lens 27 are fixed by pressing each other, and the outer edge portion of the image side surface of the seventh lens 27 is provided with stoppers, which can also be fixed by dispensing an adhesive or pressing ring, so that all the lenses are fixed in the lens barrel 1. It should be noted that the number of lenses in the lens group is not limited thereto.

In the present disclosure, the positioning and assembly of the lens group 2 and the lens barrel 1 are achieved by the mutual matching between the first lens 21 and the first barrel wall 12 and the mutual matching between any adjacent two of the seven lenses. The lens module of the present disclosure adopts a multi-matching structure design, so as to improve the assembly stability of the lens and improve the overall performance of the lens module, thereby improving the imaging quality of the lens module.

Compared with the prior art, the lens module of the present disclosure, which adopts a multi-matching structure design, can improve the assembly stability of the lens and improve the overall performance of the lens module, thereby improving the imaging quality of the lens module.

It should be understood by those skilled in the art that the above embodiments are merely some specific embodiments of the present disclosure, and various changes in form and details may be made without departing from the scope of the present disclosure.

What is claimed is:

1. A lens module, comprising:
a lens barrel; and
a lens group received in the lens barrel,
wherein the lens barrel comprises a first barrel wall extending in a horizontal direction and a section barrel wall extending from the first barrel wall while being bent, the first barrel wall comprising a first surface close to an object side and a second surface close to an image side,
the lens group comprises a first lens and a second lens that match each other from the object side to the image side, the first lens being a glass lens, the second lens being a plastic lens, and the first lens and the second lens each comprising an optical portion and a peripheral portion surrounding the optical portion,
wherein the second surface of the first barrel wall comprises:
a first planar surface horizontally extending from a joint between the first barrel wall and the second barrel wall towards an optical axis;
a first oblique surface obliquely extending from the first planar surface towards the optical axis and towards the image side; and
a second planar surface horizontally extending from the first oblique surface towards the optical axis,
wherein an object side surface of the peripheral portion of the first lens comprises:
a third planar surface horizontally extending from an outer edge of the first lens towards the optical axis, the third planar surface being fitted to the first planar surface;
a second oblique surface obliquely extending from the third planar surface towards the optical axis and towards the image side, the second oblique surface being attached to the first oblique surface; and
a fourth planar surface horizontally extending from the second oblique surface towards the optical axis,
wherein an image side surface of the peripheral portion of the first lens comprises:

a fifth planar surface horizontally extending from the outer edge of the first lens towards the optical axis;
a third oblique surface obliquely extending from the fifth planar surface towards the optical axis and towards the image side; and
a sixth planar surface horizontally extending from the third oblique surface towards the optical axis,
wherein the object side surface of the second lens comprises:
a seventh planar surface attached to the fifth planar surface;
a fourth oblique surface obliquely extending from the seventh planar surface towards the optical axis and towards the image side; and
an eighth planar surface horizontally extending from the fourth oblique surface towards the optical axis, the fourth oblique surface being spaced apart from the third oblique surface.

2. The lens module as described in claim 1, wherein a first arcuate transition surface is provided between the first planar surface and the first oblique surface, a second arcuate transition surface is provided between the third planar surface and the second oblique surface, and the first arcuate transition surface is spaced apart from the second arcuate transition surface.

3. The lens module as described in claim 1 further comprising a light-shading sheet disposed between the sixth planar surface and the eighth planar surface.

4. The lens module as described in claim 2, further comprising a light-shading sheet disposed between the sixth planar surface and the eighth planar surface.

5. The lens module as described in claim 1, wherein the lens group further comprises a third lens matching an image side surface of the second lens, the third lens being a plastic lens.

6. The lens module as described in claim 2, wherein the lens group further comprises a third lens matching an image side surface of the second lens, the third lens being a plastic lens.

7. The lens module as described in claim 5, wherein the image side surface of the second lens comprises:
a ninth planar surface attached to an object side surface of the third lens;
a fifth oblique surface obliquely extending from the ninth planar surface towards the optical axis and towards the object side; and
a tenth planar surface horizontally extending from the fifth oblique surface towards the optical axis,
the object side surface of the third lens comprises:
an eleventh planar surface attached to the ninth planar surface;
a sixth oblique surface attached to the fifth oblique surface; and
a twelfth planar surface horizontally extending from the sixth oblique surface towards the optical axis,
wherein a light-shading sheet is disposed between the tenth planar surface and the twelfth planar surface.

8. The lens module as described in claim 5, further comprising a fourth lens matching an image side surface of the third lens, the fourth lens being a plastic lens.

9. The lens module as described in claim 8, wherein the image side surface of the third lens comprises:
a thirteenth planar surface attached to an object side surface of the fourth lens;
a seventh oblique surface obliquely extending from the thirteenth planar surface towards the optical axis and towards the object side; and a fourteenth planar surface horizontally extending from the seventh oblique surface towards the optical axis, the object side surface of the fourth lens comprises:

a fifteenth planar surface attached to the thirteenth planar surface;

an eighth oblique surface attached to the seventh oblique surface; and a sixteenth planar surface horizontally extending from the eighth oblique surface towards the optical axis, wherein a light-shading sheet is disposed between the fourteenth planar surface and the sixteenth planar surface.

10. The lens module as described in claim 8, further comprising a fifth lens disposed at an image side of the fourth lens and spaced apart from the fourth lens, the fifth lens being a plastic lens.

11. The lens module as described in claim 10, wherein a light-shading sheet is disposed between the fourth lens and the fifth lens.

12. The lens module as described in claim 10, further comprising a sixth lens located at an image side of the fifth lens and spaced apart from the fifth lens, the sixth lens being a plastic lens.

13. The lens module as described in claim 12, wherein a light-shading sheet is disposed between the fifth lens and the sixth lens.

14. The lens module as described in claim 12, further comprising a seventh lens disposed at an image side of the sixth lens and spaced apart from the sixth lens, the seventh lens being a plastic lens.

15. The lens module as described in claim 14, wherein a light-shading sheet and a light-shading plate are sandwiched between the sixth lens and the seventh lens.

* * * * *